United States Patent [19]

Naujock

[11] Patent Number: 5,271,559
[45] Date of Patent: Dec. 21, 1993

[54] THERMAL ISOLATION DEVICE FOR HEATER CORE TO PREVENT OVER-HEAT DAMAGE

[75] Inventor: Arthur A. Naujock, Livonia, Mich.
[73] Assignee: Chrysler Corporation, Highland Park, Mich.
[21] Appl. No.: 940,154
[22] Filed: Sep. 3, 1992
[51] Int. Cl.5 .............................................. B60H 1/02
[52] U.S. Cl. ................................ 237/12.3 B; 236/36; 236/93 A; 165/35
[58] Field of Search ............................ 237/12.3 B, 8 R; 236/34.5, 36, 93 A; 165/35, 38, 40; 137/625.5

[56] References Cited

U.S. PATENT DOCUMENTS

| | | | |
|---|---|---|---|
| 2,277,814 | 3/1942 | Booth | 237/12.3 B |
| 2,300,011 | 10/1942 | Rose | 236/36 |
| 3,007,199 | 9/1975 | Kreger | 237/12.3 B |
| 4,196,847 | 4/1980 | Gobien | 236/93 A |
| 4,373,666 | 2/1983 | Williams | 237/12.3 B |
| 4,556,171 | 12/1985 | Fukami et al. | 237/12.3 B |
| 4,693,417 | 9/1987 | Arold et al. | 237/12.3 B |
| 4,865,249 | 9/1989 | Sugano et al. | 237/12.3 B |

FOREIGN PATENT DOCUMENTS 641049  6/1949  United Kingdom ........... 237/12.3 B

Primary Examiner—John K. Ford
Attorney, Agent, or Firm—Kenneth H. MacLean

[57] ABSTRACT

In a vehicle with a liquid cooled engine and a heat exchanger such as an interior heater for the passenger compartment, an isolation device positioned therebetween for normally permitting flow of liquid from the engine cooling system to the heat exchanger and then back to the engine cooling system but for blocking flow to the heat exchanger when the liquid temperature is excessive. The device including a thermally responsive power means responsive to a high liquid temperature to block liquid flow to the heat exchanger and redirect the flow in bypass relation to the heat exchanger.

2 Claims, 4 Drawing Sheets

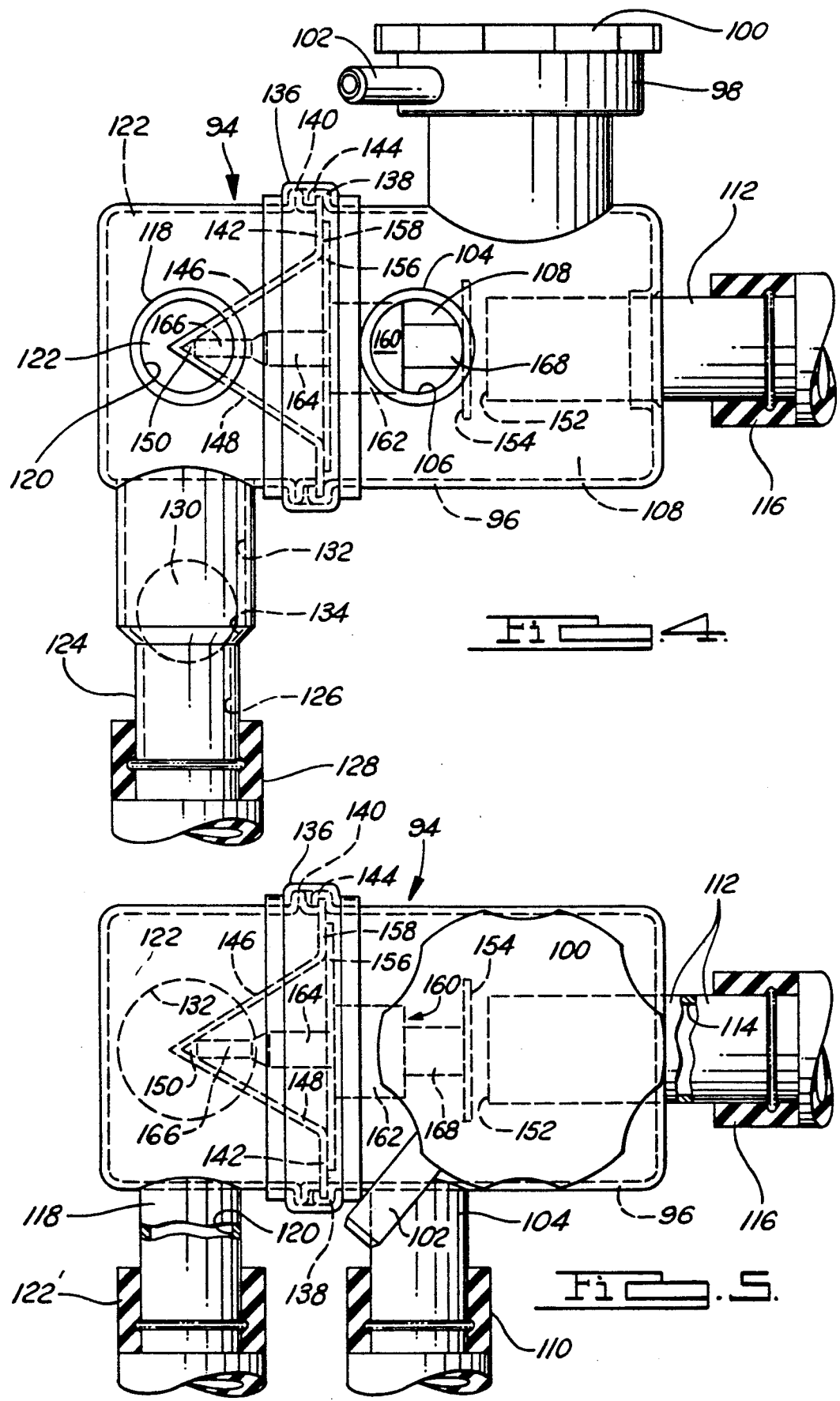

THERMAL ISOLATION DEVICE FOR HEATER CORE TO PREVENT OVER-HEAT DAMAGE

BACKGROUND OF THE INVENTION

1. Field of the Invention

This application concerns a thermal isolation device for placement between the liquid cooling system of a vehicle (engine, pump and radiator) and a heat exchanger (heater core) for the passenger compartment. Below a maximum desired liquid temperature, the isolation device allows liquid from the engine cooling system to flow to the heat exchanger and back into the engine cooling system. Above the maximum liquid temperature, a thermal power element and associated valves block flow to the heat exchanger and redirect flow in bypass relationship to the heat exchanger.

2. Description of Related Art

The subject thermal isolation device provides protection from thermal damage for a heater core such as the heater in a vehicle. Applicant is unaware of any other device for this purpose. However, from an operational standpoint, the nearest known device is the common automotive engine thermostat. This engine thermostat is typically located at the outlet of the engine cooling system. When in a closed operative condition, it prevents circulation of coolant through the radiator so that the engine more rapidly reaches an operating temperature. When the coolant temperature increases to a start-to-open temperature, a thermal power element in the thermostat begins to open a valve so that coolant is permitted to flow through a radiator and then back to the engine by means of a pump.

The subject thermal isolation device uses a thermal power element which is similar to the power element in the above described thermostat. In the isolation device, the power element opens a bypass valve and closes other valves so that the excessively hot liquid cannot flow into the heater which is provided to warm air in the passenger compartment. This protects the heater core from damage. In use, the isolation device is positioned between an engine cooling system including a radiator and the heater core.

SUMMARY OF THE INVENTION

The subject thermal isolation device is positioned between the liquid cooling system of a vehicle engine and a heat exchanger such as the heater core which is used for warming a passenger compartment air. Unlike the vehicle's radiator which is well cooled, the heater core is enclosed in a confined space within the heater and/or air conditioning plenum enclosure. Also, unlike the radiator, the heater core does not have a direct pressure release mechanism. The radiator is occasionally exposed to relatively high liquid temperatures which it can tolerate but it is undesirable to expose the heater core to these same high temperatures. For example, while it is not uncommon for radiators to be exposed to coolant over 220 degrees F., it is desirable to limit the exposure of heater cores to a maximum liquid temperature of about 220 degrees F.

The thermal isolation device utilizes a thermal power element or thermal motor which responds to a predetermined high liquid temperatures to block liquid flow into both inlet and outlet of the heater core. Since the available power elements are not isothermal devices, they operate over a range of temperatures. Therefore, it is necessary to select a power element which begins to respond (tends to operate a valve) at a temperature such as 195–200 degrees F., less than the maximum temperature. The power element should complete its response at or below the maximum temperature, for example, 215 to 220 degrees F.

Heated liquid coolant is pumped from the engine into the isolation device. The coolant first passes through an inlet and around a thermal power element. The power element is operatively attached to a first valve which is maintained in a normally opened condition at liquid temperatures below about 195 degrees F. This allows coolant to flow to the heater core. Coolant returns from the heater core to the isolation device through a second inlet and then back to the engine cooling system. A second valve can be utilized in coordination with the first valve to regulate coolant flow from the heater and particularly prevent flow into the heater through the outlet when the valve is in a closed operative condition. A still third valve is use to normally block the flow of coolant between the first inlet and the second outlet which would bypass the heater core.

When the coolant temperature increases to a start-to-open temperature of the power element, the valves at the inlet and outlet of the heater begin to move toward a closed position. Simultaneously, the third valve is moved from a closed position towards a more open position. As the coolant temperature increases further, the power element closes the two valves and fully opens the third in response to a maximum desired coolant temperature. Thereafter, flow to the heater core is blocked through both the inlet and outlet and coolant passes past the third opened valve through the device and back to the engine cooling system.

Therefore, an object of this thermal isolation device is to allow flow of liquid into a heater core at liquid temperatures below a predetermined maximum temperature but block the flow when the temperature of the liquid increases above the maximum.

Another object of this thermal isolation device is to provide a thermal power element which responds to increasing liquid temperatures and begins to inhibit flow to the heater core at a temperature below the maximum design temperature and fully blocks both the inlet and outlet of the heater core when the liquid attains the maximum temperature.

Still further objects and advantages of the subject thermal isolation device will be more apparent by reference to the following detailed description of an embodiment, reference being made to the drawings thereof as described hereafter.

IN THE DRAWINGS

FIG. 1 is a elevational and sectioned view of an embodiment of the thermal isolation device in its normal opened operative condition while connected to a somewhat schematic view of the engine liquid cooling system and a heater core; and FIG. 2 is a view similar to FIG. 1 but with the thermal isolation device in a closed operative condition blocking flow to the heater core and allowing a bypass flow; and FIG. 3 is a perspective and sectioned view of a second embodiment of the thermal isolation device; and FIG. 4 is a side elevational view of the second embodiment shown in FIG. 3 and FIG. 5 is a top elevational view of the second embodiment shown in FIG. 3.

DETAILED DESCRIPTION OF A PREFERRED EMBODIMENT

Figure 1:
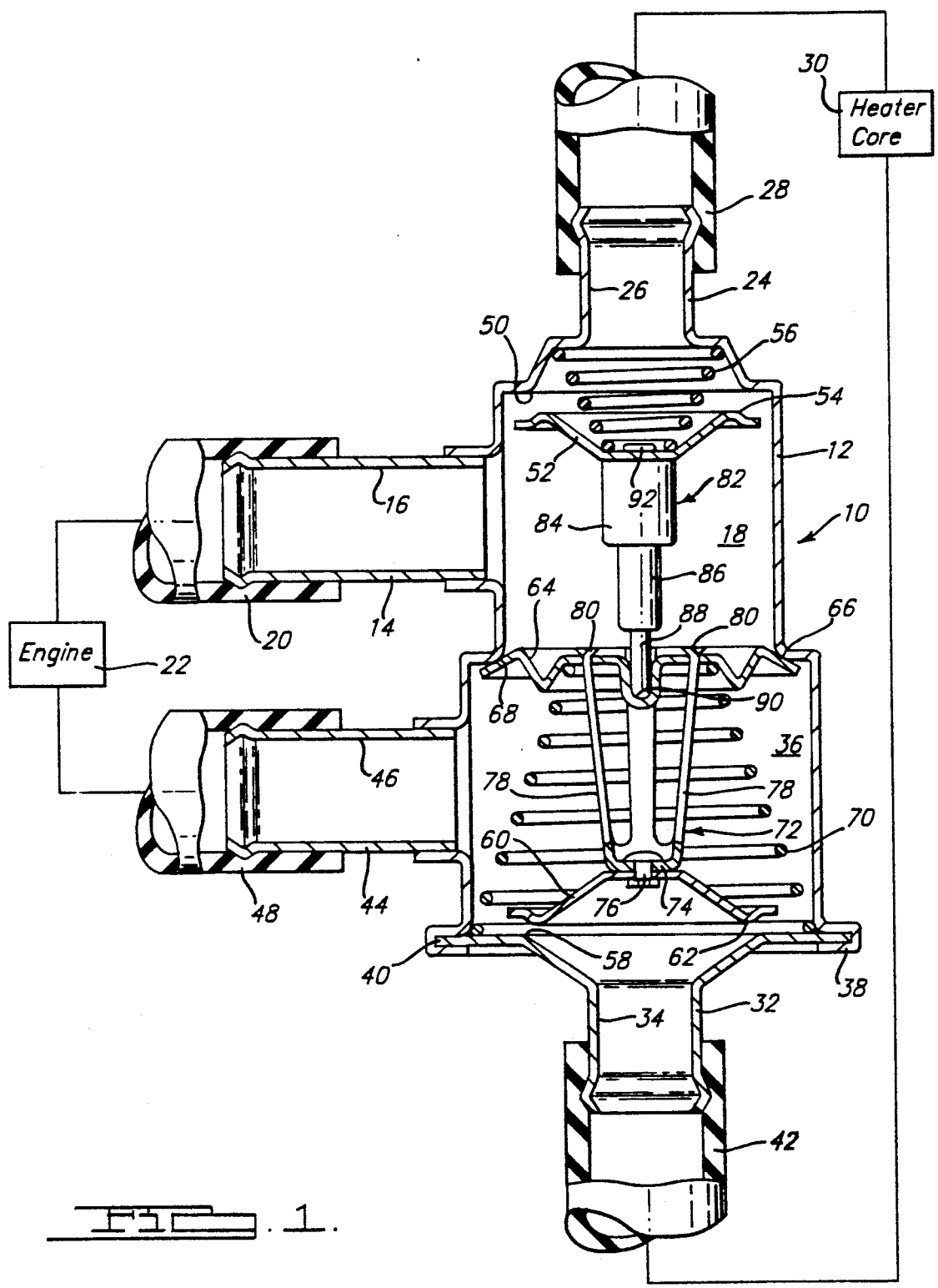

In FIG. 1, the subject isolation device 10 is shown. It includes a thin walled enclosure 12 which has a first inlet fitting 14 defining a fluid passage 16 into an interior space 18 of enclosure 12. A flexible hose 20 is attached to the fitting 14 to transmit liquid from an engine cooling system labeled 22. The enclosure also has a first outlet fitting 24 defining a passage 26 from interior space 18. A flexible hose 28 is attached to the fitting 24 to transmit liquid to a heater core 30.

A second inlet fitting member 32 defines a fluid passage 34 leading into another interior space 36 of enclosure 12. Fitting 32 is attached to a lower portion of enclosure 12 by a folded over edge 38 which sealingly engages edge 40 of fitting 32. A flexible hose 42 is connected to a fitting 32 and transmits liquid from heater core 30. A second outlet fitting 44 defines a passage 46 from space 36. A flexible hose 48 is attached to the fitting 44 and transmits liquid back to the engine cooling system 22.

A valve seat forming shoulder 50 in the upper space 18 encircles the end of passage 26. A disc shaped valve member 52 defines an annular surface 54 normally spaced from the seat 50 to permit liquid to flow from the engine cooling system 22 into hose 28 and the heater core 30. A spring 56 biases the valve member 52 away from the seat surface 50.

At the lower end of enclosure 12, the fitting 32 defines an annular seat surface 58. A disc shaped valve member 60 has an annular surface 62 normally spaced from seat surface 58 to permit liquid to flow from heater core 30 into interior space 36 and then through passage 46 back into the engine cooling system 22.

The interior spaces 18 and 36 are normally separated from one another by a disc shaped valve 64 having an annular surface 66 adapted to seat against a seat surface 68 formed by enclosure 12. Normally, a spring 70 biases the valve member 64 against seat 68 so that liquid cannot flow directly from inlet passage 16 to outlet passage 46.

Valve member 64 supports valve 60 is a spaced relation by means of connecting member 72 to normally maintain the valve surface 62 and seat surface 58 apart. Member 72 has a generally U-shaped configuration with a central portion 74 attached by a fastener 76 to the midportion of valve 60. The member 72 includes upwardly projecting legs 78 which are attached to valve 64. Specifically, the uppermost ends of legs 78 extend through apertures in valve 64 and are offset as at 80 to firmly interconnect them.

A thermal power element or thermal motor 82 is secured in the interior space 18 between valves 52 and 64. The thermal power element 82 includes a rigid main housing 84 and nose extension 86. An elongated actuating pin 88 extends through extension 86 and into housing 84. The lower end of pin 88 is secured in a central socket or pocket 90 formed by valve 64. The upper end or base 92 of thermal element 82 is attached to the midportion of valve 52. Pin 88 extends deeply into housing 84 and is surrounded by a waxy substance that responds to a temperature increase by expansion. Expansion causes the pin 88 to be progressively expelled from the housing 84 and nose portion 86. A seal (not visible) about the pin prevents the waxy substance from escaping. A thermal power element as described is commercially available in different temperature ranges. This means that a power element with a start to open temperature of say 195 degrees F. and a fully opened temperature of say 220 degrees F. can be selected. Accordingly, further explanation of the power element is deemed unnecessary.

In FIG. 1, the valves 52, 60 and 64 are in their normal operative positions corresponding to a coolant temperature below the preselected start to open temperature. Accordingly, expulsion of pin 88 has not yet begun. A reasonably low coolant temperature of about 195-200 degrees F. should maintain the thermal device 10 in the condition illustrated in FIG. 1 with a properly selected power element. In this operative condition, a full flow of coolant is transmitted to heater core 30 through the device.

As the coolant temperature increases, upwards from say 195-200 degrees F., the power element begins to open and expel pin 88 from the housing. Since the element 82 is attached between valves 52 and 64, the resultant elongation causes valve 52 to move upward toward seat surface 50 and valve 64 to move downward away from seat 68. The bypass flow directly from interior space 18 past valve 64 to interior space 36 begins.

Figure 2:
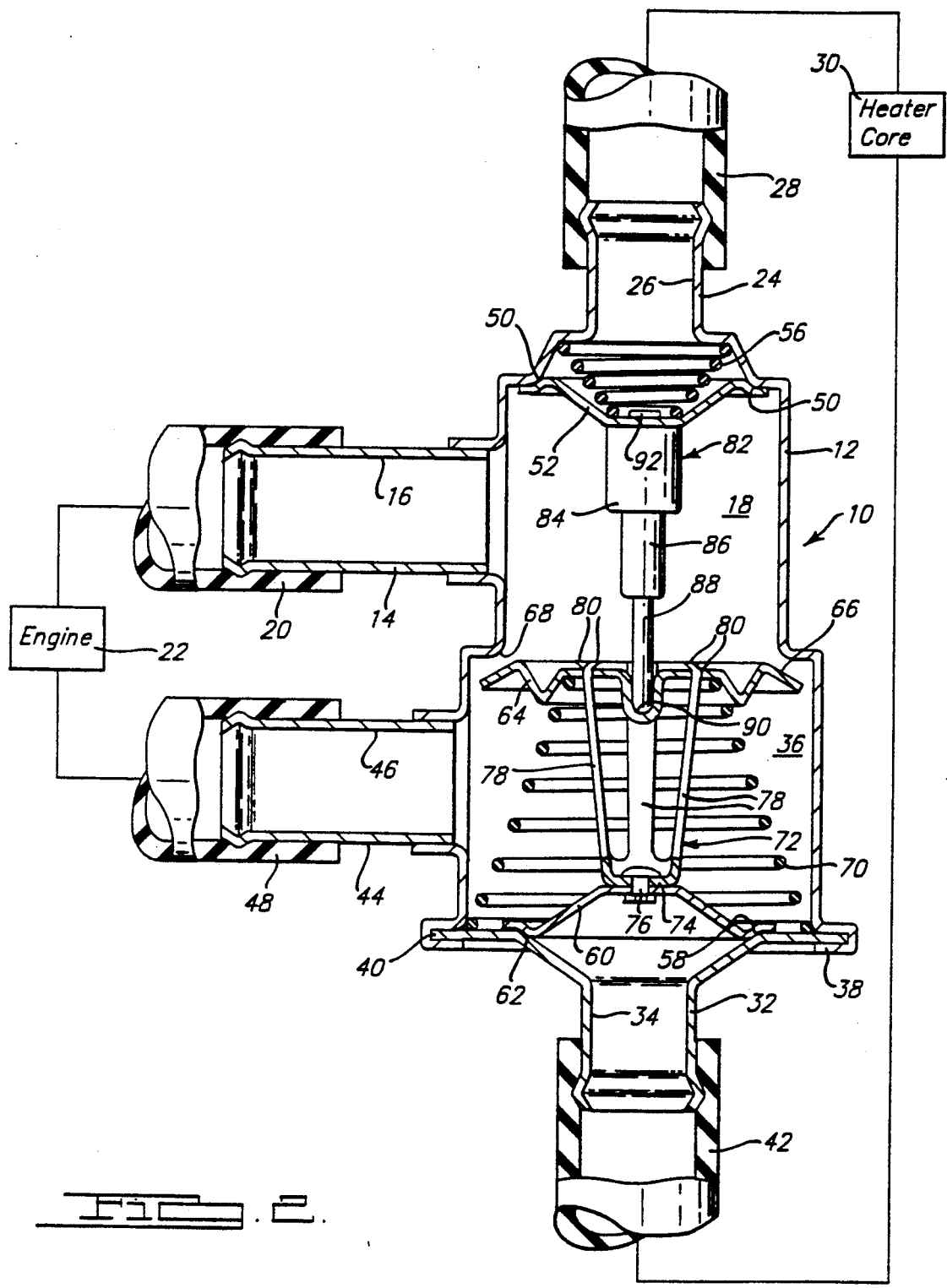

In FIG. 2, the valves 52 and 60 have seated against seat surfaces 50 and 58 respectively. Thus, the inlet and outlet of heater core 30 are blocked. Simultaneously, the valve 64 has moved from seat surface 68 to allow a bypass flow between passages 16 and 46 without flow through the heater core 30.

Figure 3:
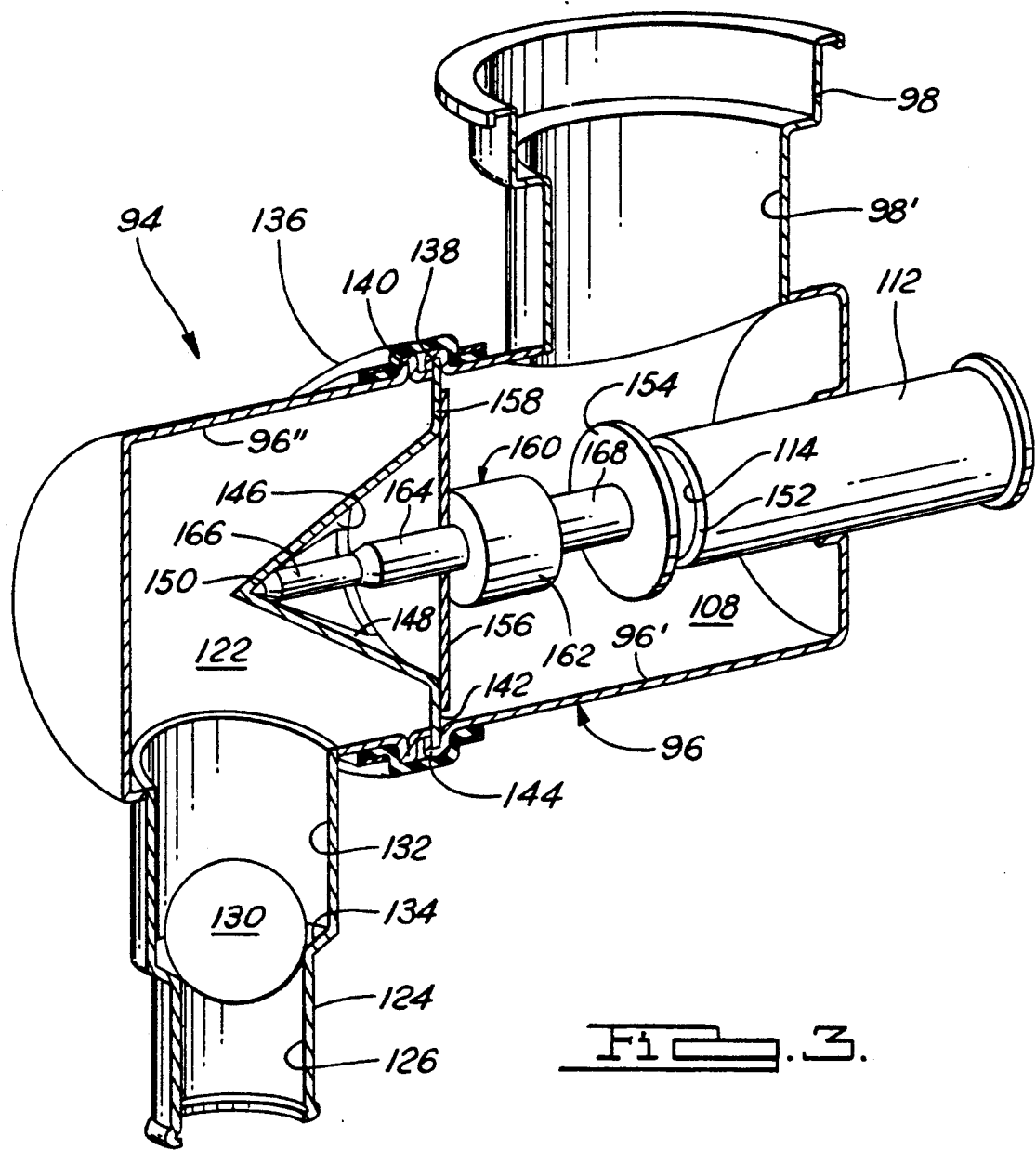

In FIGS. 3, 4 and 5, a second embodiment of a thermal isolation device 94 is illustrated. Device 94 has a thin walled enclosure 96 like the first embodiment. A filler inlet fitting 98 of conventional design is attached to the enclosure 96 for introducing liquid coolant through passage 98'. A conventional pressure cap 100 (absent in FIG. 3) attaches to the fitting 98 as shown in FIGS. 4 and 5. An outlet fitting 102 accepts the discharge of coolant which can be caused by expansion as the engine cooling system increases in temperature.

As shown in FIGS. 4 and 5, the enclosure 98 has a first inlet fitting 104 defining a fluid passage 106 into an interior space 108 of enclosure 96. A flexible hose 110 is attached to the fitting 104 to transmit liquid from an engine cooling system (not shown). The enclosure also has a first outlet fitting 112 defining a passage 114 from interior space 108. A flexible hose 116 is attached to the fitting 112 to transmit liquid to a heater core (not shown).

A second inlet fitting 124 defines a fluid passage 126 leading into another interior space 122 of enclosure 96. A flexible hose 128 is connected to fitting 124 and transmits liquid from heater core 30 into interior space 122. A second outlet fitting 118 defines a passage 120 from interior space 122. A flexible hose 122' is attached to the fitting 118 and transmits liquid back to the engine cooling system.

The second embodiment includes a ball type check valve 130 captured in an enlarged portion 132 of fitting 124. The transition between the smaller portion 126 and larger portion 132 forms an inclined surface or shoulder 134 forming a seat against which the ball check valve 134 engages when in a closed position blocking reverse flow of liquid from space 122 back into passage 126 and into the associated heater core. During normal flow, the ball valve is unseated from surface 134. Although not shown, the ball valve is prevented from movement into interior space 122 by means of a blocking member such as a pin extending across the enlarged portion 132 or by a screen member therein.

In the second embodiment, the enclosure 96 is composed of two members 96' and 96" as best shown in FIG. 3. The two members are mechanically attached together in a sealed relationship by an annular shaped retainer ring 136. Ring 136 engages radially offset portions 138 and 140 on members 96' and 96". As best shown in FIG. 3, an apertured partition member 142 is captured between the end of member 96" and a folded over portion 144 of member 96'. The partition member 142 separates interior spaces 108, 122. Member 142 includes a bridge structure including legs 146 and 148 with openings therebetween. Legs 146, 148 join to form a central socket portion 150, the purpose of which will be described below.

The outlet fitting 112 extends through the end wall of the enclosure 96 and includes and inwardly extending portion into interior space 108. Fitting 112 has an open interior end therein which defines a valve seat surface 152. A disc shaped valve member 154 is normally spaced from the seat surface 152 to permit liquid to flow from the interior space 108 to the heater core.

At the leftward end of enclosure 96, the inlet fitting 124 defines seat surface 134. When liquid flows in a direction from passage 126 into space 122, the ball check valve 130 is lifted from seat 134 to permit flow back to the interior space 122 from the associated heater core. Liquid then flows to the associated engine cooling system through the outlet fitting 118.

Interior spaces 108 and 122 are normally separated from one another by the partition member 142 and a disc shaped valve member 156 which seats against annular seat 158 formed by member 142. When the temperature of the liquid is relatively cool, flow between inlet and outlet passages 106, 114 and inlet and outlet passages 124, 118 is blocked by the valve member 156.

A thermal power element or motor 160 is mounted in interior space 108 between valves 154 and 156. The thermal element 160 includes a rigid main housing 162 and nose portion 164. An elongated actuating pin 166 extends through nose extension 164 into housing 162. The leftward end of pin 166 engages a central socket 150 formed by the member 142. The rightward end portion of thermal element 160 is extended at 168 with a midportion of valve 154 attached thereto. For a further description of the thermal actuator or motor 160 and operation thereof, reference is made to the previous description of the first embodiment.

When the liquid temperature increases above the start to open temperature of thermal motor 160, say 195-200 degrees F., pin 166 is progressively expelled from its housing 162 and nose extension 164. This resultant axial expansion of the motor 160 moves valve 154 toward seat surface 152 and moves valve 156 away from the seat surface 158. Thus, liquid flow from inlet passage 106 is progressively inhibited from flowing into passage 114 and redirected to flow past valve 156 in bypass relation to the heater core. When the desired maximum temperature condition is reached, valve 154 engages seat 152 to block flow into the passage 114 and to the associated heater core. Also, the flow from inlet passage 106 passes opened valve 156 into outlet passage 120 in bypass relation to the heater core.

In FIGS. 3-4, the valves 154 and 156 are in a normal operative position corresponding to a liquid temperature below the start to open temperature of the thermal element 160. Consequently, expulsion of the pin 166 has not yet begun.

When the maximum liquid temperature is attained, the valve 154 will be seated against seat surface 152 blocking flow to the heater core. Also, the valve 156 will have moved away from seat surface 158 to permit full flow of liquid between the inlet passage 106 and outlet passage 120. The increased pressure in space 122 seats ball valve 130 against surface 134 which prevents flow into the outlet passage 126 and to the heater core.

Although only two preferred embodiments have been illustrated and described in detail, it should be understood that modifications are contemplated which would fall within the scope of the invention as defined by the following claims.

What is claimed is as follows:

1. An improvement for a vehicle having an engine with a liquid cooling system and an associated heat exchanger core to warm the vehicle interior, the improvement comprising: a thermal isolation device between the engine cooling system and the heat exchanger core to prevent the passage of liquid to the core when the liquid temperature increases above a maximum desired value, the isolation device normally permitting a flow of liquid from the engine cooling system to the heat exchanger core and back to the engine and alternately blocking flow of liquid to the heat exchanger core when the liquid temperature is above the desirable maximum temperature; the isolation device having two inlets and two outlets, a first inlet for fluid connection with the engine cooling system for receiving liquid therefrom, a first outlet for fluid connection to the heat exchanger core for passing liquid thereto, a second inlet for fluid connection to the heat exchanger core for receiving liquid back to the isolation device, and a second outlet for fluid connection with the engine cooling system to return liquid thereto; a first valve member positioned between the first inlet and the first outlet, the first valve member being normally open allowing liquid flow from the engine cooling system to the heat exchanger core; a second valve member positioned between the second inlet and the second outlet, the second valve member being normally open allowing liquid to return from the heat exchanger to the engine cooling system; a third valve member positioned between the first inlet and the second outlet, the third valve member being normally closed to block liquid flow from the first inlet directly to the second outlet in bypass relationship to the heat exchanger core; a temperature responsive thermal power means operatively connected to the three valves and positioned to receive liquid flow from the first inlet, the power means moving in response to a temperature increase to close the first and second valves and open the third valve when the liquid temperature reaches a maximum desired high temperature, whereby excessively hot liquid is prevented from entering either the inlet or outlet of the heat exchanger and liquid flow is directed from the first inlet to the second outlet in bypass relationship to the heat exchanger core.

2. The thermal isolation device set forth in claim 1 in which spring means normally biases the first and second valve members toward its opened position and the third valve member toward its closed position whereby movements of the power element in response to increasing temperature moves the valves against the spring bias to effect valve repositioning.

* * * * *